F. H. YOCUM.
TANNING MACHINE.
APPLICATION FILED SEPT. 26, 1908.
916,821.
Patented Mar. 30, 1909.
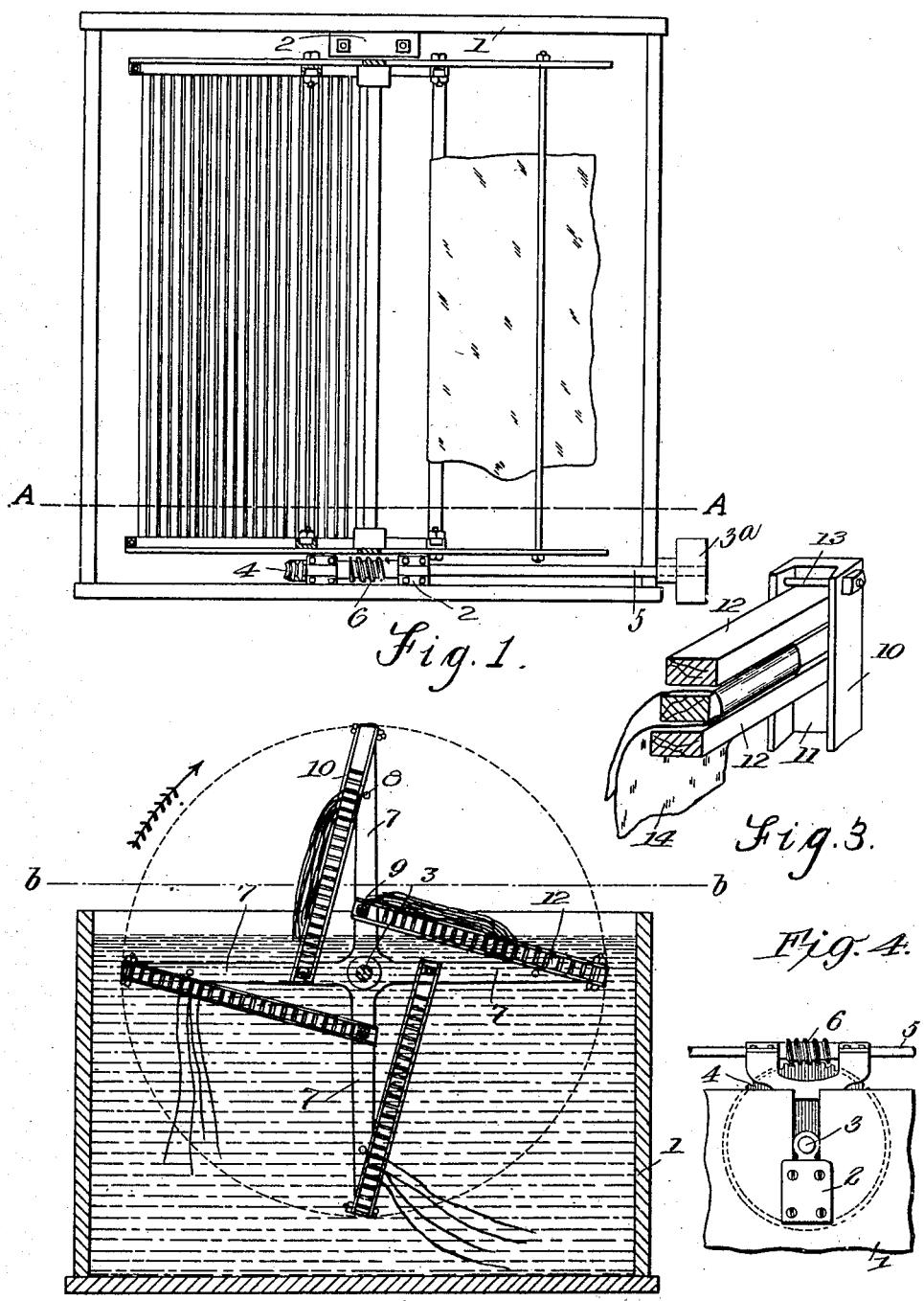
WITNESSES
Samuel E. Wade
C. E. Trainer
INVENTOR
FRANK H. YOCUM,
BY Munn & Co.
ATTORNEYS

UNITED STATES PATENT OFFICE.

FRANK HORTON YOCUM, OF LONDON, ONTARIO, CANADA.

TANNING-MACHINE.

No. 916,821.     Specification of Letters Patent.     Patented March 30, 1909.

Application filed September 26, 1908. Serial No. 454,860.

*To all whom it may concern:*

Be it known that I, FRANK HORTON YOCUM, a citizen of the United States, and a resident of the city of London, in the county of Middlesex and Province of Ontario, Dominion of Canada, have made certain new and useful Improvements in Tanning-Machines, of which the following is a specification.

My invention is an improvement in tanning machines and consists in certain novel constructions and combinations of parts hereinafter described and claimed.

The object of the invention is to expedite the process of tanning and to render it more perfect, and this object I attain by alternately dipping the hides into and removing them from a vat of liquor, and in so arranging the hides with reference to each other, that they will pass through and emerge from the liquor in a separated condition, but while out will be in a packed condition, which assists in expressing the liquor from the hides, thus subjecting the hides to an alternate injection and expression, whereby to cause the liquor to more easily enter their pores, and to change the liquor so to speak at frequent intervals.

Referring now to the drawings forming a part hereof—Figure 1 is a section on the line $b$—$b$ of Fig. 2; Fig. 2 is a section on the line A—A of Fig. 1, Fig. 3 is a detail perspective view of a portion of the retaining bars and their guideways, and Fig. 4 is a detail of a portion of the driving mechanism.

The vat 1 is provided at each end, near the top at approximately the center of its side with bearings 2, in which is journaled a shaft 3, provided at one end with a worm-wheel 4. A second shaft 5, is journaled on the side of the tank adjacent to the worm-wheel, and the shaft is provided with a worm 6 meshing with the worm-wheel. The shaft extends beyond the vat and is provided with a pulley, or other suitable means $3^a$, whereby the shaft may be rotated, to rotate the shaft 3. The shaft 3 is provided near each end with radial arms 7, and the corresponding arms at each side of the vat are connected by rods 8 and 9, the rods 8 being near the outer ends of the arms, and the rods 9 near their inner ends.

A plate 10 is connected with each of the arms by means of the rods 9, and the inner faces of the plates are grooved as at 11 to form guideways, in which are received the ends of bars 12, and a bolt 13 crosses the guideways at their outer ends to limit the outward movement of the bars. The plates 10 are inclined with respect to the arms, as will be evident from an inspection of the drawing, and the outer ends thereof may be secured to the succeeding arm in any suitable manner to retain them in such position.

In using the improvement, the hides 14 are placed on the bars, with their ends hanging as shown in Fig. 3, and the bars with the hides thereon, are placed in the guideways in superimposed relation and retained in place by inserting the bolts 13 transversely of the guideways. Power is now applied to the shaft 5 to rotate it and the reel formed by the shaft 3, the radial arms, the plate, and the bars, to successively dip the hides into the liquor and remove them therefrom.

It will be noticed from an inspection of Fig. 2, that before the hides enter the liquor, they are in superimposed relation, their weights tending to express the liquor therefrom. As the reel advances the series of bars approaches the position shown at the bottom of Fig. 2, and the hides are turned over by their own weight, falling into separated relation, and remain so until they pass out of the liquor. When the series of bars reach the position shown at the top of Fig. 2, they move by their own weight again into superimposed relation. It will be evident that during the travel of the hides out of the liquor, approximately the first half is in a separated condition, and the other half in an impacted condition, thus permitting them to drain freely before expression begins, while the greater part of their travel in the liquor is in a separated condition. As the bars pass around it will be seen that the hides are exposed with the broad side of the combined bars to the air, forming a grid, so that the air passes through the bars and emerges on the hides thereby obtaining the beneficial action of the air to a maximum extent. It is important that the plates, which carry the bars, be inclined in the direction of rotation, as it causes a freer movement of the bars than if the plates were arranged radially. In addition such position permits the hides to drain more thoroughly when out of the liquor. Also if the arms were held in plates of equal length and arranged radially, the bars would never entirely pass out of the liquor as they do in the present construction.

I claim—

1. A device of the class described comprising a vat, a reel journaled therein, said reel comprising a shaft, provided with radial arms, plates inclined with respect to the arms and provided on their inner faces with guideways, bars for holding the hides having their ends movable in the guideways, means for retaining the bars in place, and means for rotating the reel.

2. A device of the class described comprising a vat, a shaft journaled therein, a series of plates having guideways on their inner faces at each end of the shaft, the plates being in spaced relation and inclined in the direction of travel of the shaft, and bars having their ends movable in the guideways and adapted to support the hides.

3. A device of the class described, comprising a vat, adapted to contain a tanning liquid, a reel journaled therein, the axis of the reel being adjacent to the top of the vat, and the arms of the reel being inclined to radii of the reel, said arms comprising each a superposed series of independent bars adapted to support the hides, said bars having a limited movement toward and from the axis of the reel for the purpose set forth.

4. A device of the class described, comprising a vat, a reel journaled therein, the arms of the reel each comprising a superposed series of independent bars for supporting the hides, and means for permitting the bars to have a limited motion toward and from the axis of the reel for the purpose set forth.

FRANK HORTON YOCUM.

Witnesses:
LAURA O'ROURKE,
MICHAEL PATRICK McDONAGH.